United States Patent
Richman (10) Patent No.: US 9,137,114 B2
(45) Date of Patent: Sep. 15, 2015

(54) COMPUTER ECOSYSTEM PROVIDING DEVICE ANNOUNCEMENTS OF SESSION NEEDS AND RULE-BASED ESTABLISHMENT OF NETWORK SHARING BASED THEREON

(71) Applicant: SONY CORPORATION, Tokyo (JP)

(72) Inventor: Steven Martin Richman, San Diego, CA (US)

(73) Assignee: Sony Corporation, Tokyo (JP)

( * ) Notice: Subject to any disclaimer, the term of this patent is extended or adjusted under 35 U.S.C. 154(b) by 90 days.

(21) Appl. No.: 14/157,994

(22) Filed: Jan. 17, 2014

(65) Prior Publication Data

US 2015/0207687 A1 Jul. 23, 2015

(51) Int. Cl.
*H04L 12/14* (2006.01)
*H04L 12/24* (2006.01)
*H04L 12/26* (2006.01)

(52) U.S. Cl.
CPC ........ *H04L 41/0896* (2013.01); *H04L 41/0816* (2013.01); *H04L 43/0894* (2013.01)

(58) Field of Classification Search
CPC ..................... H04L 12/2825; H04L 12/40163; H04L 12/14; H04L 12/26
USPC .................................. 370/230; 709/225, 231
See application file for complete search history.

(56) References Cited

U.S. PATENT DOCUMENTS

| | | | |
|---|---|---|---|
| 6,292,465 B1 | 9/2001 | Vaid et al. | |
| 6,678,248 B1 * | 1/2004 | Haddock et al. | 370/235 |
| 6,754,230 B2 | 6/2004 | Purpura et al. | |
| 7,130,927 B2 | 10/2006 | Denecheau et al. | |
| 7,529,263 B1 | 5/2009 | Sparrell et al. | |
| 7,602,756 B2 | 10/2009 | Gu et al. | |
| 7,788,357 B2 * | 8/2010 | Riley et al. | 709/223 |
| 7,796,566 B2 | 9/2010 | Xhafa et al. | |
| 7,809,375 B2 | 10/2010 | Thermond | |
| 7,843,865 B2 * | 11/2010 | Kumar | 370/312 |
| 7,860,124 B2 | 12/2010 | Wang et al. | |
| 7,904,578 B1 | 3/2011 | Anschutz et al. | |
| 7,920,593 B2 | 4/2011 | Haran et al. | |
| 7,936,775 B2 | 5/2011 | Iwamura | |
| 7,940,794 B2 | 5/2011 | Zhang et al. | |
| 8,271,657 B2 * | 9/2012 | Eastham | 709/227 |
| 8,356,110 B2 | 1/2013 | Udani et al. | |
| 8,375,414 B2 | 2/2013 | Covey | |
| 8,452,302 B2 | 5/2013 | Rahman et al. | |
| 8,489,720 B1 | 7/2013 | Morford et al. | |
| 8,660,071 B2 * | 2/2014 | Borran et al. | 370/329 |
| 2003/0043846 A1 | 3/2003 | Purpura et al. | |
| 2004/0133689 A1 | 7/2004 | Vasisht | |
| 2004/0261101 A1 | 12/2004 | Iwamura | |
| 2006/0088036 A1 | 4/2006 | De Prezzo | |

(Continued)

FOREIGN PATENT DOCUMENTS

WO    WO 2009091776 A1 *  7/2009

*Primary Examiner* — Khaled Kassim
*Assistant Examiner* — Berhanu Belete
(74) *Attorney, Agent, or Firm* — John L. Rogitz (57) ABSTRACT

A home network can be dynamically reconfigured when IP connected or wireless devices are requesting network access makes it easier for consumers to keep their current viewing, listening, or Internet sessions alive and functioning properly. Home network use can be managed by any device on the home network if desired, not just a central home router, through series of messages that are exchanged by each device updating its priority status.

17 Claims, 5 Drawing Sheets

(56) References Cited

U.S. PATENT DOCUMENTS

| | | |
|---|---|---|
| 2007/0027983 A1* | 2/2007 | Bowra et al. .................. 709/224 |
| 2007/0079113 A1 | 4/2007 | Kulkarni |
| 2008/0273553 A1 | 11/2008 | Wang et al. |
| 2009/0086717 A1 | 4/2009 | Nagarahalli |
| 2009/0168660 A1* | 7/2009 | Bhatia et al. .................. 370/252 |
| 2009/0317066 A1* | 12/2009 | Shibasaki .................. 386/124 |
| 2010/0100637 A1* | 4/2010 | Bowra et al. .................. 709/231 |
| 2010/0195503 A1* | 8/2010 | Raleigh .................. 370/235 |
| 2010/0238883 A1* | 9/2010 | Borran et al. .................. 370/329 |
| 2011/0085486 A1* | 4/2011 | Huang et al. .................. 370/312 |
| 2011/0182296 A1 | 7/2011 | Anschutz et al. |
| 2011/0307900 A1* | 12/2011 | Fatehpuria et al. .......... 718/104 |
| 2011/0314145 A1* | 12/2011 | Raleigh et al. ............... 709/224 |
| 2012/0147874 A1* | 6/2012 | Kotecha .................. 370/338 |
| 2012/0289147 A1* | 11/2012 | Raleigh et al. .............. 455/3.06 |
| 2013/0091278 A1 | 4/2013 | Ludwig et al. |
| 2013/0159531 A1 | 6/2013 | Katyal et al. |

* cited by examiner

COMPUTER ECOSYSTEM PROVIDING DEVICE ANNOUNCEMENTS OF SESSION NEEDS AND RULE-BASED ESTABLISHMENT OF NETWORK SHARING BASED THEREON

I. FIELD OF THE INVENTION

The present application relates generally to computer ecosystems and more particularly to providing device-managed network asset allocation in a home network.

II. BACKGROUND OF THE INVENTION

A computer ecosystem, or digital ecosystem, is an adaptive and distributed socio-technical system that is characterized by its sustainability, self-organization, and scalability. Inspired by environmental ecosystems, which consist of biotic and abiotic components that interact through nutrient cycles and energy flows, complete computer ecosystems consist of hardware, software, and services that in some cases may be provided by one company, such as Sony. The goal of each computer ecosystem is to provide consumers with everything that may be desired, at least in part services and/or software that may be exchanged via the Internet. Moreover, interconnectedness and sharing among elements of an ecosystem, such as applications within a computing cloud, provides consumers with increased capability to organize and access data and presents itself as the future characteristic of efficient integrative ecosystems.

Two general types of computer ecosystems exist: vertical and horizontal computer ecosystems. In the vertical approach, virtually all aspects of the ecosystem are owned and controlled by one company, and are specifically designed to seamlessly interact with one another. Horizontal ecosystems, one the other hand, integrate aspects such as hardware and software that are created by other entities into one unified ecosystem. The horizontal approach allows for greater variety of input from consumers and manufactures, increasing the capacity for novel innovations and adaptations to changing demands.

Present principles are directed to specific aspects of computer ecosystems, specifically, to home networks. Home network users often find themselves having problems with wireless connections, bandwidth availability, speed, and contention for access to their home broadband service from a modem or router in the home. When multiple devices are added to the home wireless or wired network, there can be degradation of the media experience if video is being watched simultaneously from different sources. There also can be issues related simply to radio frequency interference coming from appliances in the home that degrade home networks. This causes Wi-Fi devices to turn off or fail, and for media sessions to stop working, and cause a stalled or stopped entertainment experience.

SUMMARY OF THE INVENTION

Accordingly, a device includes at least one computer memory bearing instructions executable by a processing circuit, and at least one processing circuit configured for accessing the computer memory to execute the instructions to configure the processing circuit for receiving input from a user of a home network designating one or more usage metrics to be used. The usage metrics pertain to the device. The processor when executing the instructions is configured for using the one or more usage metrics to render a priority output, and comparing the priority output to comparison value to render a comparison result. Based on the comparison result, a priority of the device is determined for network resource allocation.

In some examples, the processor when executing the instructions is further configured for, based on a first comparison result, requesting additional network bandwidth, and based on a second comparison result, agreeing to relinquish network bandwidth. The comparison value may be a predetermined threshold which may be a range of values. Or, the device is a first device in the network, and the comparison value can be a priority output associated with a second device in the network. In this case, the processor when executing the instructions is further configured for calculating the comparison value at least in part based on information received from the second device. The processor when executing the instructions may be further configured for receiving the comparison value from the second device.

As set forth further below, the one or more usage metrics may be selected from the group of metrics consisting of: a location metric associated with a location of the device, a capability metric associated with a capability of the device, a content type metric associated with current content being shown on the device, a specific individual device metric, a device proximity metric associated with proximity of the device to another device in the network. Plural usage metrics selected from the group of usage metrics may be used to render the priority output.

In another aspect, a method includes presenting on a display a user interface (UI), and receiving network management input by means of the UI. The UI includes a list of usage metrics, and for at least some of the usage metrics on the list, at least one selector selectable to designate a respective usage metric for use in determining network management and/or at least one selector selectable to designate that the respective usage metric is not to be used in determining network management. For at least some of the usage metrics on the list, an entry element may be provided on the UI by which a user can input a numeric metric for a respective usage metric.

In another aspect, a system includes at least one computer memory that is not a carrier wave and that includes instructions executable by a processor which is configured for accessing the computer memory to execute the instructions to configure the processor for receiving one or more priority rules in a network governing device priority for network assets. The processor when executing the instructions is configured for announcing toe other devices on the home network a type of requested session, and responding to announced sessions and network asset needs of the other devices and applying the one or more rules to the announced sessions and network asset needs, relinquishing or gaining network resources.

In examples of this latter aspect, the processor when executing the instructions is further configured for announcing entry into the home network, with the announcement triggering a series of exchanges among all the devices on the network about what each device or user wants to do on the network. The processor when executing the instructions is further configured for negotiating with the devices on the home network for network assets, and presenting information letting a user know a priority of a device.

In some implementations, the processor when executing the instructions can be further configured for calculating a priority for a device associated with the processor. The device associated with the processor is a first device, with the calculating being in accordance with current conditions based on the rules and reports from other devices. The processor when executing the instructions may be further configured for calculating a priority for every other device on the network, with all devices arriving at the same results since all use the same rules and same reported data.

In non-limiting examples the processor when executing the instructions is further configured for receiving from a user a request for a modified priority, and sending a request to other devices on the network to adjust network asset usage to accommodate the modified priority. In non-limiting examples the processor when executing the instructions is further configured for presenting on a display device an interfaces (UI) informing a user that a network asset allocation priority associated with the processor has been lowered and the outcome thereof. The UI can present a first selector selectable to indicate acquiescence in a lower priority and a second selector selectable to override the lower priority. In other non-limiting examples the processor when executing the instructions is further configured for presenting on a display device a interfaces (UI) on a first device that a user of a second device requires added bandwidth, providing a selector selectable to agree to lower a bandwidth allocation of the first device to compensate for added network resources being provided to the second device, and providing a selector selectable to refuse to agree to relinquish bandwidth allocated to the first device.

The details of the present invention, both as to its structure and operation, can be best understood in reference to the accompanying drawings, in which like reference numerals refer to like parts, and in which:

DETAILED DESCRIPTION OF THE PREFERRED EMBODIMENT

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is an example consumer electronics (CE) device 12 that may be waterproof (e.g., for use while swimming). The CE device 12 may be, e.g., a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc., and even e.g. a computerized Internet-enabled television (TV). Regardless, it is to be understood that the CE device 12 is configured to undertake present principles (e.g. communicate with other CE devices to undertake present principles, execute the logic described herein, and perform any other functions and/or operations described herein).

Figure 1:
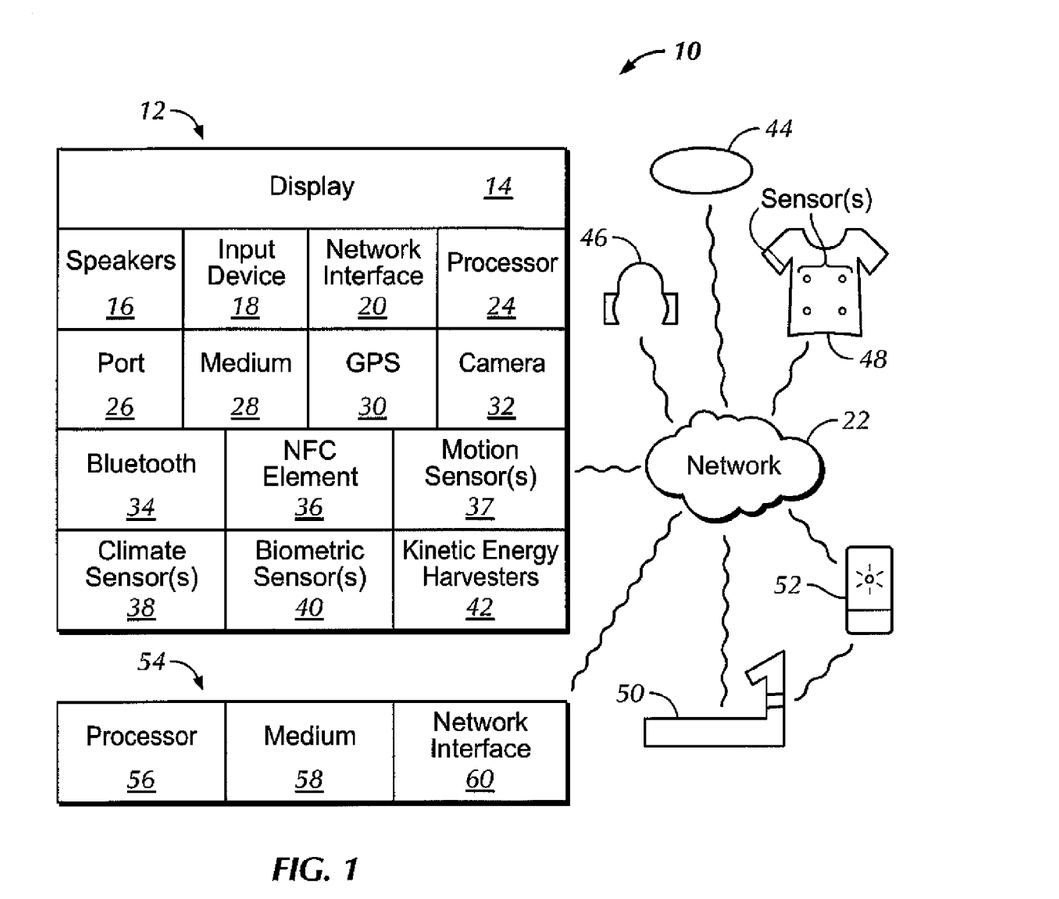
FIG. 1 is a block diagram of an example system including an example in accordance with present principles.

Accordingly, to undertake such principles the CE device 12 can be established by some or all of the components shown in FIG. 1. For example, the CE device 12 can include one or more touch-enabled displays 14, one or more speakers 16 for outputting audio in accordance with present principles, and at least one additional input device 18 such as e.g. an audio receiver/microphone for e.g. entering audible commands to the CE device 12 to control the CE device 12. The example CE device 12 may also include one or more network interfaces 20 for communication over at least one network 22 such as the Internet, an WAN, an LAN, etc. under control of one or more processors 24. It is to be understood that the processor 24 controls the CE device 12 to undertake present principles, including the other elements of the CE device 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, WiFi transceiver, etc.

In addition to the foregoing, the CE device 12 may also include one or more input ports 26 such as, e.g., a USB port to physically connect (e.g. using a wired connection) to another CE device and/or a headphone port to connect headphones to the CE device 12 for presentation of audio from the CE device 12 to a user through the headphones. The CE device 12 may further include one or more tangible computer readable storage medium 28 such as disk-based or solid state storage, it being understood that the computer readable storage medium 28 may not be a carrier wave. Also in some embodiments, the CE device 12 can include a position or location receiver such as but not limited to a GPS receiver and/or altimeter 30 that is configured to e.g. receive geographic position information from at least one satellite and provide the information to the processor 24 and/or determine an altitude at which the CE device 12 is disposed in conjunction with the processor 24. However, it is to be understood that that another suitable position receiver other than a GPS receiver and/or altimeter may be used in accordance with present principles to e.g. determine the location of the CE device 12 in e.g. all three dimensions.

Continuing the description of the CE device 12, in some embodiments the CE device 12 may include one or more cameras 32 that may be, e.g., a thermal imaging camera, a digital camera such as a webcam, and/or a camera integrated into the CE device 12 and controllable by the processor 24 to gather pictures/images and/or video in accordance with present principles. Also included on the CE device 12 may be a Bluetooth transceiver 34 and other Near Field Communication (NFC) element 36 for communication with other devices using Bluetooth and/or NFC technology, respectively. An example NFC element can be a radio frequency identification (RFD) element.

Further still, the CE device 12 may include one or more motion sensors 37 (e.g., an accelerometer, gyroscope, cyclometer, magnetic sensor, infrared (IR) motion sensors such as passive IR sensors, an optical sensor, a speed and/or cadence sensor, a gesture sensor (e.g. for sensing gesture command), etc.) providing input to the processor 24. The CE device 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that in some embodiments the CE device 12 may also include a kinetic energy harvester 42 to e.g. charge a battery (not shown) powering the CE device 12.

Still referring to FIG. 1, in addition to the CE device 12, the system 10 may include one or more other CE device types such as, but not limited to, a computerized Internet-enabled bracelet 44, computerized Internet-enabled headphones and/or ear buds 46, computerized Internet-enabled clothing 48, a computerized Internet-enabled exercise machine 50 (e.g. a treadmill, exercise bike, elliptical machine, etc.), etc. Also shown is a computerized Internet-enabled entry kiosk 52 permitting authorized entry to a space. It is to be understood that other CE devices included in the system 10 including those described in this paragraph may respectively include some or all of the various components described above in reference to the CE device 12 such but not limited to e.g. the biometric sensors and motion sensors described above, as well as the position receivers, cameras, input devices, and speakers also described above.

Now in reference to the afore-mentioned at least one server 54, it includes at least one processor 56, at least one tangible computer readable storage medium 58 that may not be a carrier wave such as disk-based or solid state storage, and at least one network interface 60 that, under control of the processor 56, allows for communication with the other CE devices of FIG. 1 over the network 22, and indeed may facilitate communication between servers and client devices in accordance with present principles. Note that the network interface 60 may be, e.g., a wired or wireless modem or router, WiFi transceiver, or other appropriate interface such as, e.g., a wireless telephony transceiver.

Accordingly, in some embodiments the server 54 may be an Internet server, may include and perform "cloud" functions such that the CE devices of the system 10 may access a "cloud" environment via the server 54 in example embodiments.

Figure 2:
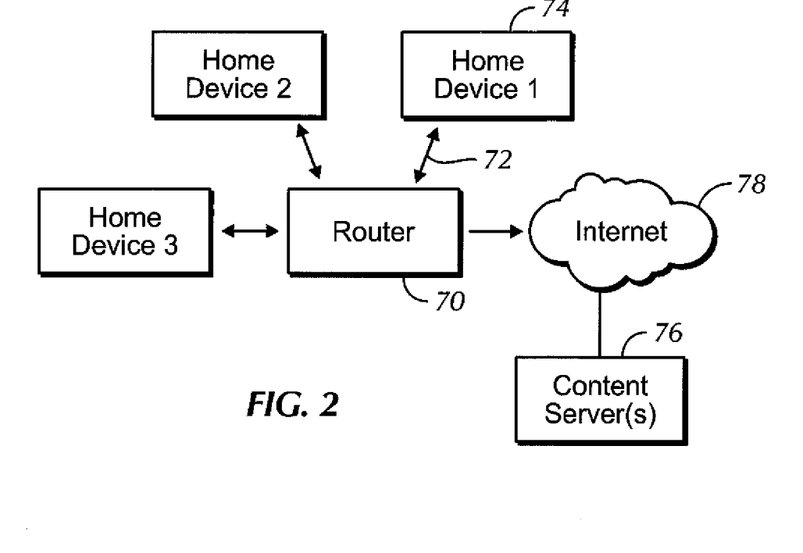
FIG. 2 is a block diagram of an example home network.

Now referring to FIG. 2, an example ecosystem embodied as a home network can include an optional network router 70 that communicates via wired or wireless links 72 with plural home devices 74 (three shown). The router may connect the home network to one or more content servers 76 (such as the server 54 in FIG. 1) via a network such as the Internet 78. The home devices 74 may be established by one or more of the CE devices described above. The router 70 typically includes a processor, computer memory, and network interface, and its functions may be assumed by one or more the home network devices 74.

Figure 3:
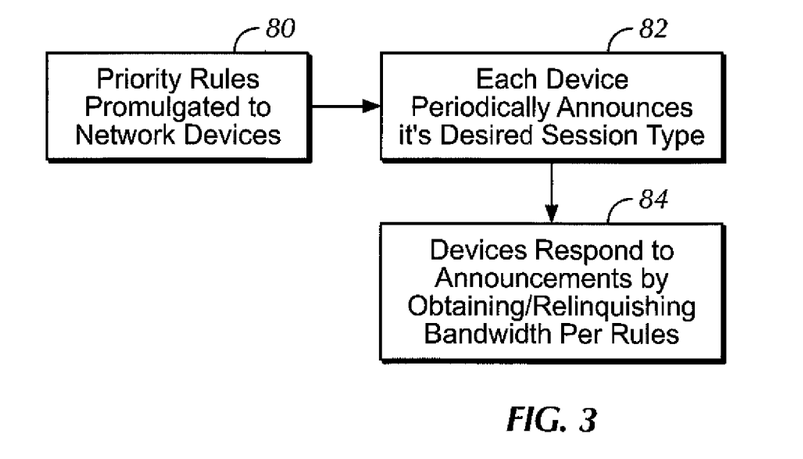
FIGS. 3 and 4 are flowcharts of example logic according to present principles.

FIG. 3 shows an overall flow of example logic according to present principles. In general, a process is shown for dynamically reconfiguring home networks when IP connected or wireless devices are requesting network access makes it easier for consumers to keep their current viewing, listening, or Internet sessions alive and functioning properly. Home network use can be managed by any device on the home network if desired, not just the central home router 70, through series of messages that are exchanged by each device updating its priority status.

At block 80 priority rules are promulgated to each device 74. These rules are discussed further below, but in general govern the priority for network assets including bandwidth for example depending on various factors used in the rules. The rules may be default rules provided by a manufacturer of the network devices 74 or more preferably may be tailored by the user of the home network.

At block 82 each device 74 on the network announces (continuously, or periodically, if desired) to the other devices on the home network directly what kind of session it is asking for. Each device also has the set of rules from block 80 that is shared by all devices on the home network that preferably has been configured by the network owner. Thus instead of having the home router 70 control all the network connected devices, the devices 74 manage themselves at block 84 by responding to the announced sessions and network asset needs of the other devices and applying the common set of rules, relinquishing or gaining network resources such as bandwidth accordingly. Overall degradation on the home network is eliminated, because there is a set of self-configurable priorities or rules made by the owner that are obeyed by every device in the network ecosystem. However, a router as a network device can also participate in this ecosystem of self-monitored devices. The priorities determine how each device responds to or initiates access on the home network.

Each device on the home network has a programmable client running on it that takes into account each end-user's network session and what type of content is being requested. When a device enters the home network it announces itself at block 86 as requesting access, e.g., over the UPnP protocol or other device discovery protocol. That announcement then triggers a series of exchanges at block 88 among all the network devices about what each device or user wants to do on the network, and references the rules established by the network owner for all devices. Examples of the elements that are considered by the client in determining its behavior are: room location, device capability, type of content, quality level of content requested, priority level for the device, user assigned priority, current broadband connection speed, current home network speed (both wireless and wired), total number of devices on the network, time of day, and proximity to other devices. Each client running on each device in the home network negotiates with the other devices and lets the users know what their priority level is at block 90 based on current conditions and rules. In essence, at block 90 each device calculates what its own priority is for current conditions based on the rules and reports from other devices, and also calculates what the priority is for every other device on the network, with all devices arriving at the same results since all use the same rules and same reported data. Alternatively, each device may simply calculate its own priority based on the reported data from other devices and the rules and then send its calculated priority to the other devices.

Spontaneous adjustments can be made to enable the most devices to keep live content, but in some cases a device may tell the user it cannot connect due to network overload and lower priority at block 92. The user can then request a higher priority by giving a reason that reaches all the users on the network, and each user can respond by deliberately lowering their priority level assigned to give another user access. This live and dynamic content and network management takes into account network conditions, devices, and the users themselves in controlling the ecosystem. This is in contrast to having the router only control a choke point to the cable modem, or a cloud server control the bandwidth into the home. There are automatic adjustments made by referring to the master rules established by the network owner.

Decision diamond 94 indicates that responsive to messages presented at block 92, users may accept automatic re-prioritization at block 96 or may override automatic re-prioritization at block 98. Real time adjustments can be made by referring to information input by each device owner who requests a higher priority or is willing to lower the priority of the device. A pop-up visual display screen can let users know what is being requested and recommended solutions presented to keep the network functioning optimally.

Figure 4:
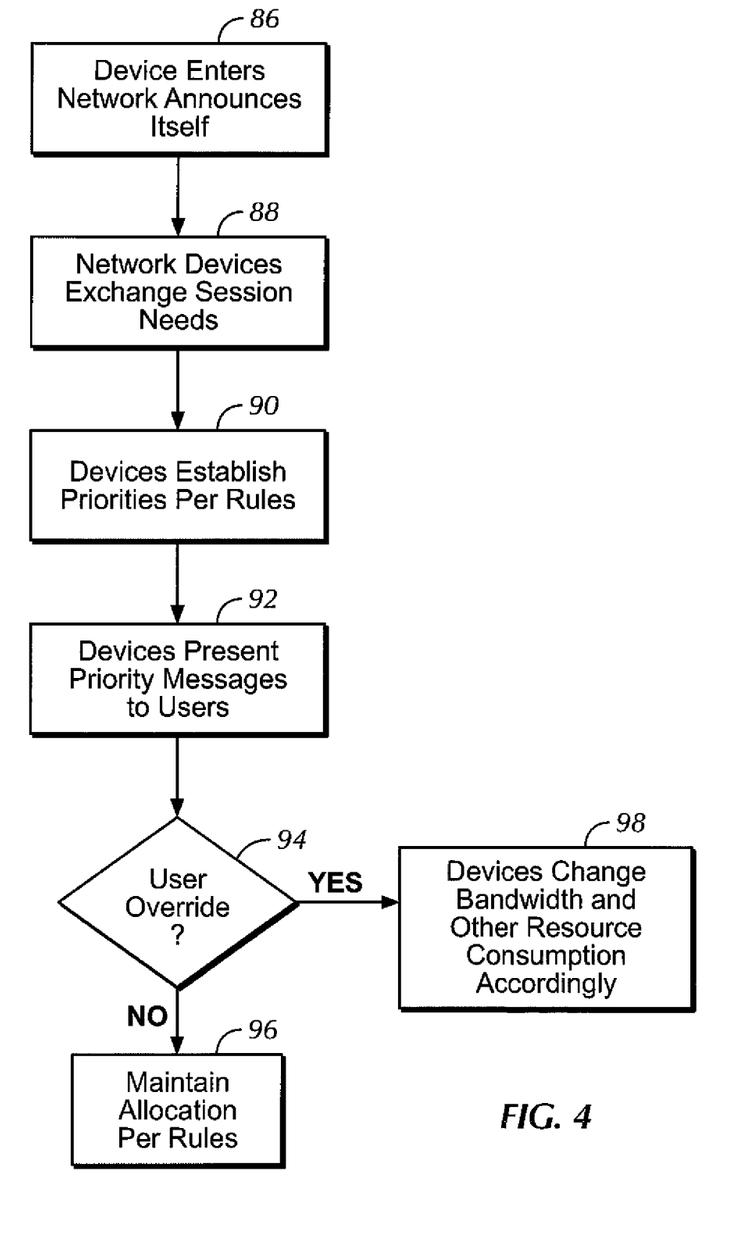
Figure 5:
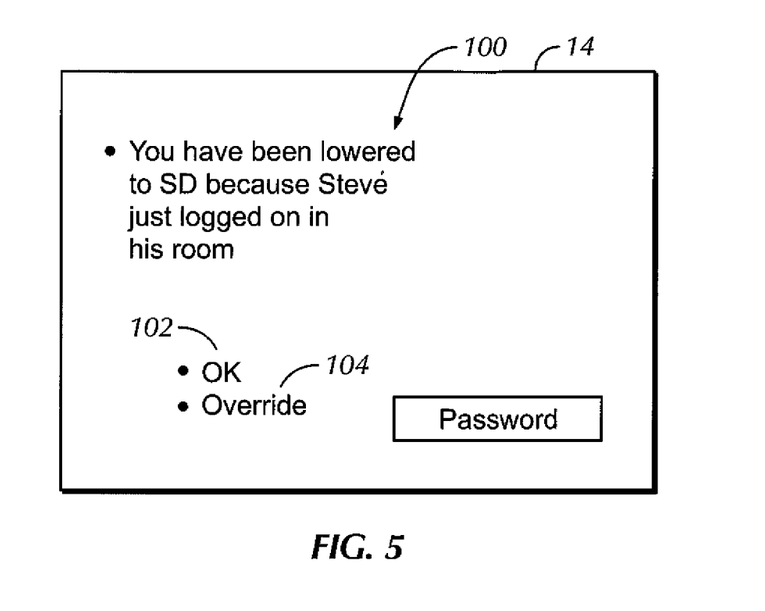
FIGS. 5-7 are example user interfaces (UI) according to present principles.
Figure 6:
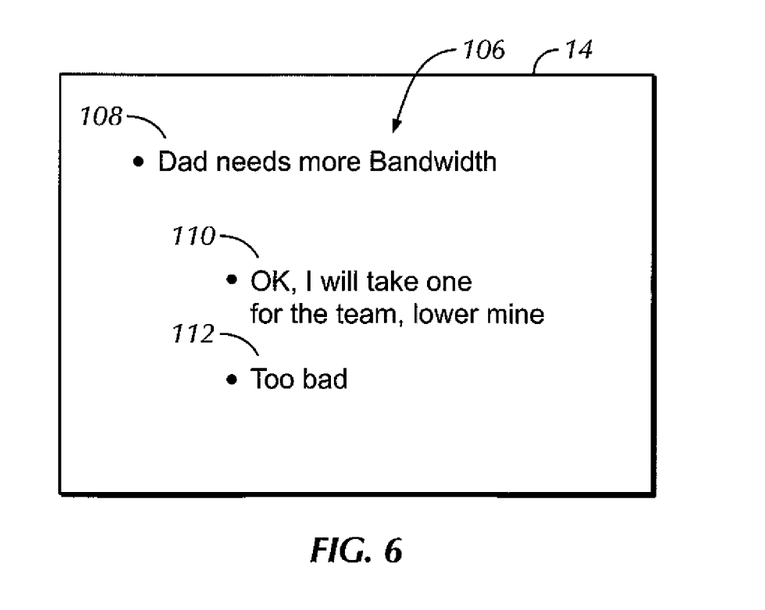

FIGS. 5 and 6 show user interfaces (UIs) that can be presented on the display 14 of one of the home devices 74 at block 92 in FIG. 4. A UI 100 may be presented on a demoted device responsive to the devices cooperating to allocate less bandwidth to that device, informing the user that the device priority has been lowered and the outcome thereof (in the example shown, that the device can provide only standard definition resolution in video instead of high definition). The message may indicate what event triggered the change, in the example shown, that another user ("Steve") logged on to another device at another location in the home. A user may accept the demotion by selecting the selector element 102 (default without selection may be acceptance) or override the demotion by selecting selector element 104. If desired, a password may have to be input and authenticated to allow the user to override the demotion.

FIG. 6 shows a UI 106 that indicates at 108 to a user of a first device that a particular user (identified by a log in to one of the home devices 74) of a second device requires added bandwidth, for example because the user of the second device just initiated play of a high definition movie on the second device. A selector 110 enables the user of the first device to agree to lower his bandwidth needs to compensate for added network resources being provided to the user of the second device. Also, a selector 112 may be selected to refuse to agree to relinquish bandwidth allocated to the first device, in which case the second device may present a UI to its user indicating that the user of the first device will not accede to losing bandwidth and, thus, that the second device may not be able to play the requested movie.

Example implementations of the above now follow. As mentioned above, the devices periodically announce various parameters to other devices as input for some of the algorithmic determinations below. For example, devices may announce their type/capability, current bandwidth usage, current content being played, current location, etc. so that other devices have this information available.

In one example, a room location metric is determined. Like the other metrics discussed below, this location metric may be determined by each device for itself and for all other devices in the home network. Or, devices may simply calculate their own priorities based on reports from other devices and the rules and then share those calculated priorities with the other devices.

Figure 7:
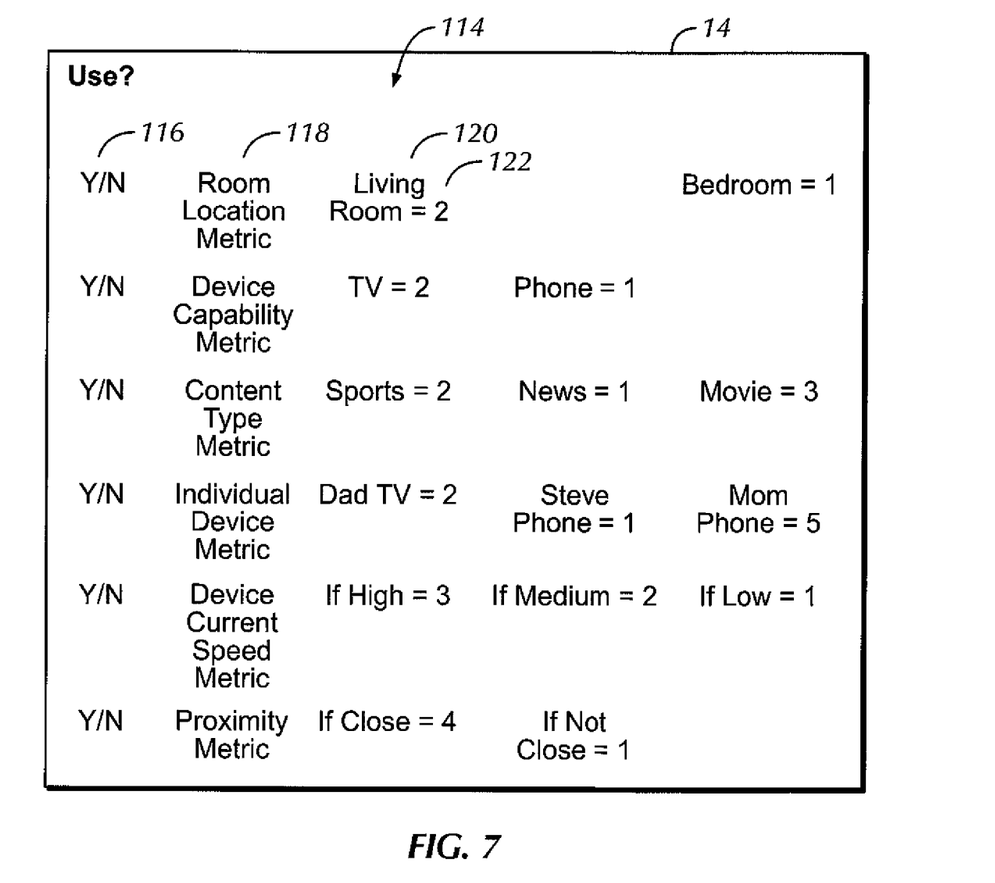

The determination of the location metric is done using a default location metric, which can be altered by the user. FIG. 7 should be referenced for this and the below discussion. In FIG. 7 a user interface 114 is presented on the display 14 of an administrator device allowing a home network administrator to select, using yes/no selectors 116, for example, one or more metrics to use in evaluating network resource allocation. Thus, the user may select one, some, or all of the example metrics shown, it being understood that the metrics are examples. Selecting "yes" results in the corresponding metric being used in the allocation rules, whereas selecting "no" results in it not being used. Each metric is given a respective name 118 and then a list of options 120, with a numeric metric 122 being listed for each option 120. The numeric metrics can be changed by the user by appropriately manipulating an input device. The range of numeric metrics may be programmatically bounded for each metric, so that, for example, some numeric values for one metric may not be permitted to exceed one number, e.g., 3, and must be at least another number, e.g., 1, with integers only being allowed, while numeric metric values for other metrics may be permitted to range from, e.g., 1 to 5. Other numeric values may be unbounded. User attempts to input an out of bound value can result in an error message being presented informing the user of the permitted ranges for that metric.

Returning to the example location metric, this metric appertains to the device being evaluated (the evaluating device itself and then the other devices being evaluated by the evaluating device). The location metric may indicate, for example, a metric of two for devices located in a family and one for devices located in a bedroom, as the example in FIG. 7 indicates. Or, the location metric may indicate, for example, a metric of one for devices located in a family and two for devices located in a bedroom. Other numeric values and other home locations may be used as well.

As indicated in FIG. 7, other metrics may be used at the user's option. These include device capability metrics, content type metrics (meaning the current content being shown on a device is given a numeric metric if the user opts in this metric), specific individual device metric, a device current speed or current bandwidth metric (the higher number indicating that the current speed for that device should be accorded more weight and thus be less susceptible to change, with the user being able to reverse that bias), and device proximity metric, in which if position information from the devices 74 indicates that two, for example, are within a threshold distance of each other, say five meters, one metric value attains, whereas if a device is not near another device, a different metric value attains.

The values for the opted-in metrics for each device are then combined, by addition or multiplication or subtraction or division or otherwise, and compared to a threshold range. Note that the bottom of the threshold range (and each corresponding threshold range value above the bottom) may be automatically established based on the number of metrics the user opts in. As an example, in embodiment in which the metrics are combined by addition, a minimum threshold value of one may be used when only one metric is opted in while a minimum threshold value of six may be used when, for example, all of the example metrics shown in FIG. 7 are opted in by the user.

In one example, assume the metric values for a device are added together to determine an aggregate value for that device, and that the permissible value ranges for the individual metrics all range from one to five. A first threshold range may be 6-10 and a second threshold range may be 11-30. Instead of threshold ranges, a single number threshold may be used, e.g., if below 12, assign low priority, if 12 or greater, assign a higher priority.

Other algorithms may be employed in lieu of threshold comparisons. For example, the aggregate values of the devices may simply be compared to each other. The device with the highest aggregate value among the devices in the network, regardless of the absolute value of the aggregate value, is given the highest rank, and the device with the lowest aggregate value, the lowest rank.

Regardless, network resources are examined and compared to the total resource needs of the devices to determine whether to invoke an allocation rule. For example, if the combined bandwidth needs of the currently active devices exceeds the available bandwidth in the network, devices with aggregate values in the lower range (equivalently, devices that have lower aggregate values than other devices regardless of the absolute value of the aggregate values) are automatically demoted (subject to user override as discussed above) while devices with aggregate values in the higher range (equivalently, devices that have higher aggregate values than other devices regardless of the absolute value of the aggregate values) are not demoted, or are accorded additional bandwidth as their individual bandwidth needs dictate.

Another example allocation rule may be that if the combined bandwidth needs of the currently active devices exceeds the available bandwidth in the network, a device with an aggregate value in the lower range that seeks additional bandwidth (as indicated by, e.g., changing from play of a SD movie to play of a HD movie) is automatically denied the added bandwidth (subject to user override as discussed above) while devices with aggregate values in the higher range are not denied the added bandwidth, with extra bandwidth for high value range devices being seized from the bandwidth of low value range devices as needed. Other rules may be used.

A device may be demoted in resources, as but one example, by not permitting game playing on that device, but permitting HD movie viewing. Or, a device may be demoted in resources, as but another example, by not permitting game playing or HD movie viewing on that device, but permitting SD movie viewing on the device.

In determining the total available network bandwidth, one component in the network periodically may request an asset of known, preferably very large, size to be sent from another component in the network, with all other devices on the network being commanded to remain quiescent on the network during the transfer. The size of the asset in bytes may be divided by the time consumed by the transfer from beginning to end to determine the network bandwidth. Or, a single manufacturer-provided default network bandwidth may be used. Other techniques for establishing a network bandwidth may be used.

In determining the bandwidth needs of each device, its current asset usage may be measured similarly, e.g., if a first device is streaming an asset from the Internet over the home network, all other devices may be commanded to remain temporarily quiescent for a few moments while the bit rate at which the asset being received is measured. Each device may execute this measurement in turn while the others remain temporarily quiescent. The combined actual device bandwidth consumptions are then added together and compared to the total available network bandwidth to determine whether the above-described priority rules should be triggered for implementation.

Yet again, whether the home network has sufficient bandwidth at any point in time for the usage being applied to it may simply be inferred from a device or devices detecting a bit error rate above a threshold, or a latency above a threshold, and reporting that to the other devices as evidence that bandwidth consumption exceeds capacity, and that therefore the rules should be triggered for implementation.

While the particular COMPUTER ECOSYSTEM PROVIDING DEVICE ANNOUNCEMENTS OF SESSION NEEDS AND RULE-BASED ESTABLISHMENT OF NETWORK SHARING BASED THEREON is herein shown and described in detail, it is to be understood that the subject matter which is encompassed by the present invention is limited only by the claims.

What is claimed is:

1. A device comprising:
   at least one computer memory that is not a transitory signal and that includes instructions executable by a processing circuit for:
   receiving input from a user of a network designating one or more usage metrics to be used, the usage metrics pertaining to the device;
   using the one or more usage metrics to render a priority output;
   comparing the priority output to a comparison value to render a comparison result;
   based on the comparison result, determining a priority of the device for network resource allocation, wherein each device on the network announces to the network directly what kind of session each device is requesting, each device having a common set of rules shared by all devices on the network such that instead of having a control device manage priorities in the network, the devices requesting content on the network manage themselves by responding to announced sessions and network asset needs of other devices on the network and applying the common set of rules, relinquishing or gaining network resources accordingly; and
   causing a user interface (UI) to be presented on a demoted device in the network, the demoted device being subject to a demotion by virtue of being subject to a determination to reduce its priority, the UI informing that a priority of the demoted device has been lowered and an outcome thereof.

2. The device of claim 1, wherein the instructions are executable for, based on a first comparison result, requesting additional network bandwidth, and based on a second comparison result, agreeing to relinquish network bandwidth.

3. The device of claim 1, wherein the comparison value is a predetermined threshold.

4. The device of claim 3, wherein the predetermined threshold is a range of values.

5. The device of claim 1, wherein the device is a first device in the network, and the comparison value is a priority output associated with a second device in the network, the first and second devices both configured for presenting audio video content in the network.

6. The device of claim 5, wherein the instructions are executable for calculating the comparison value at least in part based on information received from the second device.

7. The device of claim 5, wherein the instructions are executable for receiving the comparison value from the second device.

8. The device of claim 1, wherein the one or more usage metrics is/are selected from group of metrics consisting of: a location metric associated with a location of the device, a capability metric associated with a capability of the device, a content type metric associated with current content being shown on the device, a specific individual device metric, a device proximity metric associated with proximity of the device to another device in the network.

9. The device of claim 8, wherein the instructions are executable for combining plural usage metrics selected from the group of usage metrics to render the priority output.

10. The device of claim 1, comprising the processing circuit.

11. The device of claim 1, wherein, the UI indicates what circumstance triggered lowering the priority of the demoted device, the UI including a first selector selectable to accept the demotion and a second selector selectable to override the demotion.

12. The device of claim 1, wherein the instructions are executable for:
   presenting a user interface (UI) comprising an indication on a first device in the network that a second device in the network requires added bandwidth, the UI comprising a first selector selectable to agree to lower a bandwidth requirement of the first device to compensate for added network resources being provided to the second device, the UI comprising a second selector selectable to refuse to relinquish bandwidth allocated to the first device such that a second UI may be presented on the second device indicating that a user of the first device will not accede to losing bandwidth and, thus, that the second device may not be able to play content requested by a user of the second device.

13. A method comprising:
   presenting on a display a first user interface (UI); and
   receiving network management input by means of the first UI, the first UI comprising:
   a list of usage metrics;
   for at least some of the usage metrics on the list, at least one selector selectable to designate a usage metric for use in determining network management and/or at least one selector selectable to designate that the usage metric is not to be used in determining network management;
   for at least some of the usage metrics on the list, an entry element by which a user can input a numeric metric for a usage metric;
   presenting at least one UI selected from a second UI, a third UI, the second UI being presented on a demoted device in the network, the demoted device being subject to a demotion by virtue of being subject to a determination to reduce its priority, the second UI informing that the priority of the demoted device has been lowered and an outcome thereof, the second UI indicating what circumstance triggered lowering the priority of the demoted device, the second UI including a first selector selectable to accept the demotion and a second selector selectable to override the demotion;
   the third UI comprising an indication on a first device in the network that a second device in the network requires added bandwidth, the third UI comprising a third selector selectable to agree to lower a bandwidth requirement of the first device to compensate for added network resources being provided to the second device, the third UI comprising a fourth selector selectable to refuse to relinquish bandwidth allocated to the first device such that a fourth UI may be presented on the second device indicating that a user of the first device will not accede to losing bandwidth and, thus, that the second device may not be able to play content requested by a user of the second device.

14. The method of claim 13, wherein the list of usage metrics contains one or more of: a location metric associated with a location of a device associated with the display, a capability metric associated with a capability of the device, a content type metric associated with current content being shown on the device, a specific individual device metric, a device proximity metric associated with proximity of the device to another device in the network.

15. The method of claim 13, wherein the list of usage metrics contains plural of: a location metric associated with a location of a device associated with the display, a capability metric associated with a capability of the device, a content type metric associated with current content being shown on the device, a specific individual device metric, a device proximity metric associated with proximity of the device to another device in the network.

16. The method of claim 13, comprising presenting the second UI.

17. The method of claim 13, comprising presenting the third UI.

\* \* \* \* \*